(12) United States Patent
Kato

(10) Patent No.: US 9,517,765 B2
(45) Date of Patent: Dec. 13, 2016

(54) HYBRID VEHICLE RUNNING CONTROL APPARATUS

(71) Applicant: Kazuya Kato, Toyota (JP)

(72) Inventor: Kazuya Kato, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/767,453

(22) PCT Filed: Feb. 6, 2014

(86) PCT No.: PCT/IB2014/000110
§ 371 (c)(1),
(2) Date: Aug. 12, 2015

(87) PCT Pub. No.: WO2014/125349
PCT Pub. Date: Aug. 21, 2014

(65) Prior Publication Data
US 2016/0001772 A1  Jan. 7, 2016

(30) Foreign Application Priority Data

Feb. 14, 2013 (JP) .................. 2013-027156

(51) Int. Cl.
*B60W 20/40* (2016.01)
*B60W 20/00* (2016.01)
(Continued)

(52) U.S. Cl.
CPC ............. *B60W 20/40* (2013.01); *B60L 11/123* (2013.01); *B60L 11/1868* (2013.01);
(Continued)

(58) Field of Classification Search
CPC ...... B60W 20/40; B60W 20/00; B60W 10/06;
B60W 10/08; B60W 10/26; B60W 2710/06; B60W 2710/08; B60W 2710/244; B60L 11/123; B60L 11/1868; H02J 7/00; Y02T 10/6217; Y02T 10/7005; Y02T 10/7066; Y02T 10/7077; Y10S 903/93
(Continued)

(56) References Cited

U.S. PATENT DOCUMENTS

| | | | | |
|---|---|---|---|---|
| 9,030,162 B2 * | 5/2015 | Andersson | ............... | B60K 6/46 320/109 |
| 2005/0257968 A1 * | 11/2005 | Egami | ................... | B60K 6/365 180/65.285 |

(Continued)

FOREIGN PATENT DOCUMENTS

| EP | 2 431 211 A1 | 3/2012 |
|---|---|---|
| GB | 2 262 667 A | 6/1993 |

(Continued)

*Primary Examiner* — McDieunel Marc
*Assistant Examiner* — James E Stroud
(74) *Attorney, Agent, or Firm* — Sughrue Mion, PLLC

(57) ABSTRACT

A hybrid vehicle running control apparatus that is mounted in a hybrid vehicle that has a high-voltage battery and a low-voltage battery, and is selectively controlled to drive in a first running mode in which an electric motor to which power is supplied from the high-voltage battery is used as a drive source, and a second running mode in which an engine is used as the drive source, includes a transport state determining portion that determines whether the hybrid vehicle is in transport; and a battery running inhibiting portion that inhibits the hybrid vehicle from running in the first running mode when it is determined by the transport state determining portion that the hybrid vehicle is in transport.

9 Claims, 6 Drawing Sheets

(51) Int. Cl.
  *B60L 11/12* (2006.01)
  *B60L 11/18* (2006.01)
  *H02J 7/00* (2006.01)
  *B60W 10/06* (2006.01)
  *B60W 10/08* (2006.01)
  *B60W 10/26* (2006.01)

(52) U.S. Cl.
  CPC ............ *B60W 10/06* (2013.01); *B60W 10/08* (2013.01); *B60W 10/26* (2013.01); *B60W 20/00* (2013.01); *H02J 7/00* (2013.01); *H02J 7/0032* (2013.01); *B60W 2710/06* (2013.01); *B60W 2710/08* (2013.01); *B60W 2710/244* (2013.01); *Y02T 10/6217* (2013.01); *Y02T 10/7005* (2013.01); *Y02T 10/7066* (2013.01); *Y02T 10/7077* (2013.01); *Y10S 903/93* (2013.01)

(58) Field of Classification Search
  USPC .......................................................... 701/22
  See application file for complete search history.

(56) References Cited

U.S. PATENT DOCUMENTS

2012/0072066 A1* 3/2012 Kato .................. B60K 6/365
  701/22

2013/0073136 A1* 3/2013 Yamamoto ............. B60K 6/445
  701/22
  2013/0218385 A1* 8/2013 Wenger ................... B60L 1/003
  701/22
  2013/0297111 A1* 11/2013 Yamazaki ............. B60W 20/00
  701/22

FOREIGN PATENT DOCUMENTS

| | | |
  |---|---|---|
  | JP | 1070843 A | 3/1998 |
  | JP | 2002-365347 A | 12/2002 |
  | JP | 2006-174619 A | 6/2006 |
  | JP | 2007-060791 A | 3/2007 |
  | JP | 2008126812 A | 6/2008 |
  | JP | 2008-290604 A | 12/2008 |
  | JP | 2011-512784 A | 4/2011 |
  | JP | 2011-099691 A | 5/2011 |
  | JP | 2011-189788 A | 9/2011 |
  | JP | 2011-198555 A | 10/2011 |
  | JP | 2011-257226 A | 12/2011 |
  | WO | 2009/094367 A1 | 7/2009 |

* cited by examiner

FIG. 5

| MESSAGE RECEIVED STATUS @ ECU-A (○: RECEIVED, ×: UNRECEIVED) | | | | | VEHICLE STATE DETERMINATION |
|---|---|---|---|---|---|
| MESSAGE b | MESSAGE c | MESSAGE d | MESSAGE e | | |
| ○ | ○ | ○ | ○ | | NORMAL STATE |
| ○ | × | × | × | | VEHICLE-IN-TRANSPORT STATE |
| × | × | × | × | | COMMUNICATION ERROR |
| ○ | ○ | ○ | × | | ECU-E ABNORMALITY |

US 9,517,765 B2

HYBRID VEHICLE RUNNING CONTROL APPARATUS

BACKGROUND OF THE INVENTION

1. Field of the Invention

The invention relates to a hybrid vehicle running control apparatus. More particularly, the invention relates to a running control apparatus that is mounted in a hybrid vehicle that has a high-voltage battery and a low-voltage battery, and is selectively controlled to drive in a first running mode in which an electric motor to which power is supplied from the high-voltage battery is used as a drive source, and a second running mode in which an engine is used as the drive source.

2. Description of Related Art

Japanese Patent Application Publication No. 2006-174619 (JP 2006-174619 A), for example, describes a related running control apparatus of a hybrid vehicle that has a high-voltage battery, a low-voltage battery, and a DC-DC converter that performs voltage conversion between the high-voltage battery and the low-voltage battery, and is selectively controlled to drive in a first running mode (an EV running mode) in which an electric motor to which power is supplied from the high-voltage battery is used as a drive source, and a second running mode in which an engine is used as the drive source.

This running control apparatus activates a controller at regular intervals of time, after an ignition switch has been switched from on to off. Every time the controller is activated, power is supplied from a high-voltage main battery to a low-voltage auxiliary battery via a DC-DC converter to charge the auxiliary battery. Therefore, even if the hybrid vehicle is left for an extended period of time, the auxiliary battery will be charged at regular intervals of time using the main battery. As a result, the auxiliary battery is able to be prevented from going dead.

The technology described in JP 2006-174619 A is implemented when there is at least a predetermined capacity remaining (i.e., SOC: state-of charge) in the main battery. On the other hand, the main battery is typically charged to full charge when a vehicle is assembled. In a hybrid vehicle, EV running is allowed when the SOC (state-of-charge) of the main battery is equal to or greater than a predetermined SOC, and EV running is prohibited when the SOC is below the predetermined SOC. Therefore, if EV running is allowed when vehicle transport from when the hybrid vehicle is assembled until the vehicle is delivered takes a long period of time, such as when a hybrid vehicle is an export, the SOC of the main battery tends to decrease with this transport. As a result, the life of the main battery may decrease, and charging the auxiliary battery may be difficult.

SUMMARY OF THE INVENTION

The invention thus provides a hybrid vehicle running control apparatus that inhibits a decrease in the capacity of a main battery during vehicle transport, by limiting EV running of the hybrid vehicle when the vehicle is in transport.

One aspect of the invention relates to a hybrid vehicle running control apparatus. This hybrid vehicle running control apparatus is mounted in a hybrid vehicle that has a high-voltage battery and a low-voltage battery, and is selectively controlled to drive in a first running mode in which an electric motor to which power is supplied from the high-voltage battery is used as a drive source, and a second running mode in which an engine is used as the drive source. The hybrid vehicle running control apparatus includes a transport state determining portion that determines whether the hybrid vehicle is in transport, and a battery running inhibiting portion that inhibits the hybrid vehicle from running in the first running mode when it is determined by the transport state determining portion that the hybrid vehicle is in transport.

According to the invention, a decrease in the capacity of a high-voltage battery during vehicle transport can be inhibited by limiting EV running of the hybrid vehicle when the vehicle is in transport.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a chart of a matrix for determining the vehicle state in the running control apparatus of the example embodiment.

DETAILED DESCRIPTION OF EMBODIMENTS

Hereinafter, detailed example embodiments of the hybrid vehicle miming control apparatus of the invention will be described with reference to the accompanying drawings.

Figure 1:
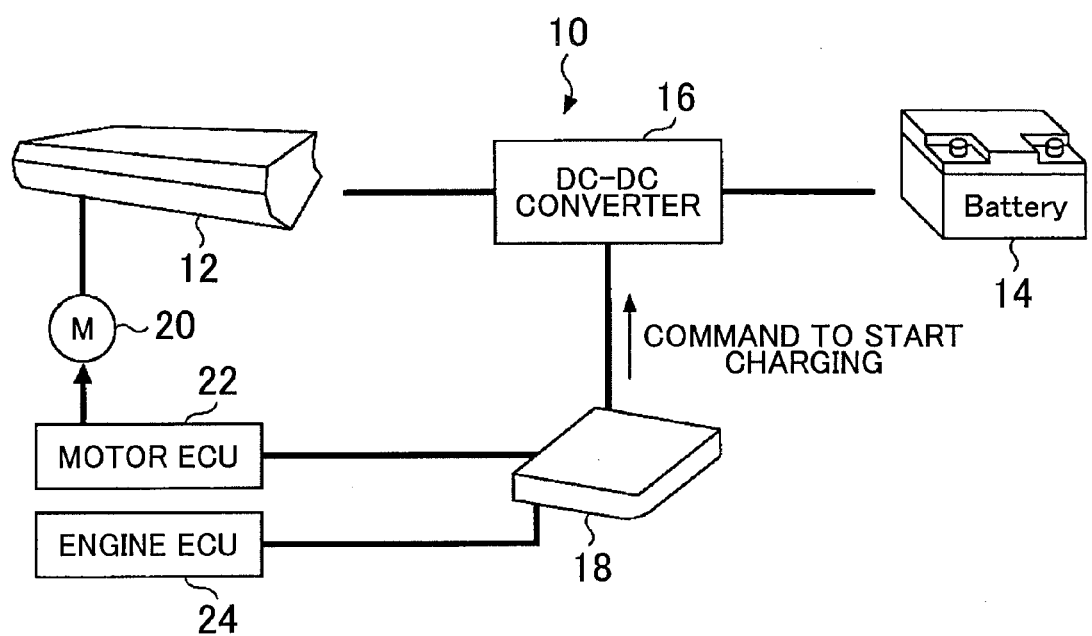
FIG. 1 is a block diagram of a hybrid vehicle miming control apparatus according to one example embodiment of the invention.
Figure 2:
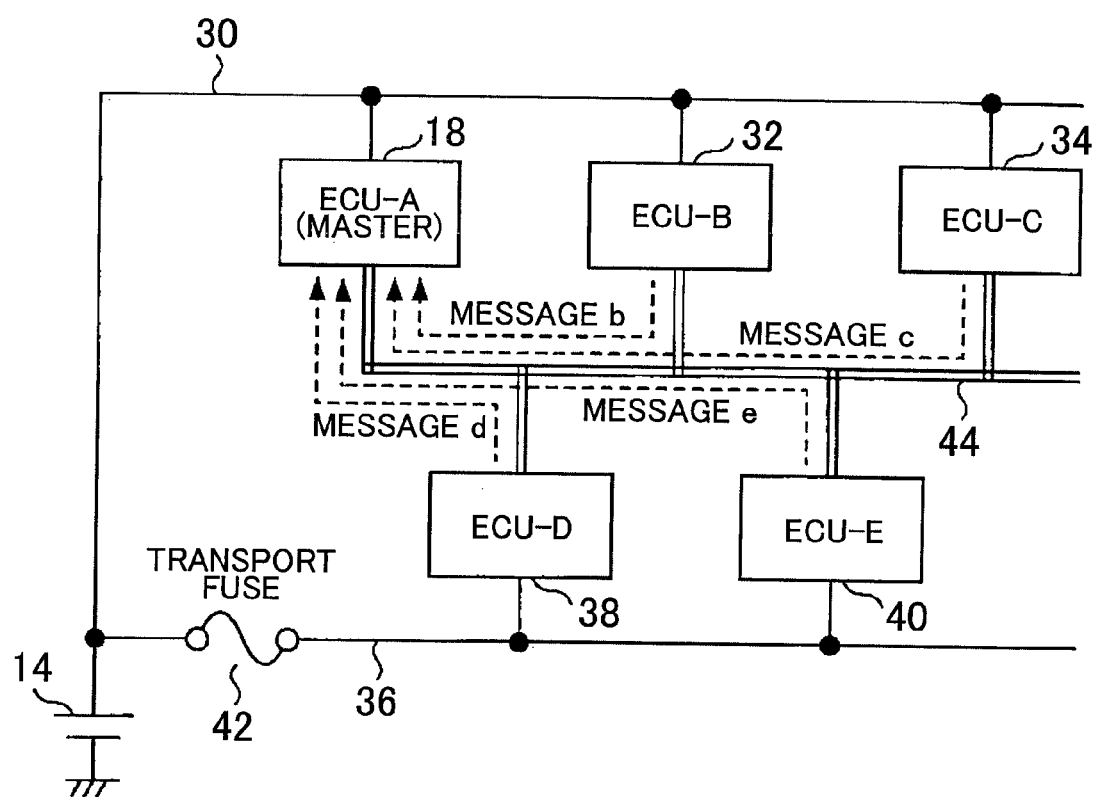
FIG. 2 is a block diagram of a system that supplies power to various electronic control units mounted in a hybrid vehicle of the example embodiment.

FIG. 1 is a block diagram of a hybrid vehicle running control apparatus (hereinafter also simply referred to as "running control apparatus") 10 according to one example embodiment of the invention. Also, FIG. 2 is a block diagram of a system that supplies power to various electronic control units mounted in the hybrid vehicle of the example embodiment. The hybrid vehicle running control apparatus 10 according to this example embodiment is an apparatus that is mounted in a hybrid vehicle or a plug-in hybrid vehicle that is selectively controlled to run using an electric motor as a drive source (i.e., EV running; also referred to as an EV running mode), and to run using an engine as the drive source (i.e., engine running; also referred to as an engine running mode). This running control apparatus 10 controls the running of this vehicle.

In this example embodiment, a hybrid vehicle equipped with the running control apparatus 10 has a high-voltage battery 12 that outputs a relatively high voltage, and a low-voltage battery 14 that outputs a relatively low voltage. The high-voltage battery 12 is a battery that can supply power to an electric motor that generates power for the vehicle, and is capable of outputting voltage of approximately 300 volts, for example, to the electric motor and the like. Also, the low-voltage battery 14 is an auxiliary battery that can supply power to auxiliaries and the like in the vehicle, and is capable of outputting voltage of approximately 12 volts, for example, to auxiliaries and the like. The high-voltage battery 12 and the low-voltage battery 14 are able to be charged by regenerating braking or power generated by a motor-generator as the vehicle engine operates, or the like, when an ignition of the vehicle is on.

The hybrid vehicle equipped with the running control apparatus 10 also has a DC-DC converter 16 interposed between the high-voltage battery 12 and the low-voltage battery 14. The DC-DC converter 16 is able to perform a direct-current (DC) voltage conversion between the high-voltage battery 12 and the low-voltage battery 14. The DC-DC converter 16 includes a switching element, a transformer, a capacitor, and a diode and the like, and is an insulated DC-DC converter in which an input side is insulated from an output side, for example.

The DC-DC converter 16 at least performs a step-down conversion on the voltage applied to the low-voltage battery 14 by stepping down the voltage output from the high-voltage battery 12, using a charge-discharge phenomenon of the energy of the capacitor and the transformer by the switching on and off of the switching element. As a result, with the high-voltage battery 12 as the power supply, power is able to be supplied from this high-voltage battery 12 to the low-voltage battery 14. Also, the DC-DC converter 16 is able to vary the voltage output to the low-voltage battery 14.

An electronic control unit (hereinafter, referred to as "ECU") 18 that is made up mainly of a microcomputer, is connected to the DC-DC converter 16. The ECU 18 is a control apparatus that, controls the voltage conversion in the DC-DC converter 16, and is an HV-ECU that controls hybrid running of the host vehicle. This ECU 18 receives various information, such as information indicative of an ignition state of the vehicle, information indicative of the state-of-charge (SOC) of the high-voltage battery 12, and information indicative of the state-of-charge (SOC) of the low-voltage battery 14. The ECU 18 generates a signal to activate the DC-DC converter 16 based on the various information that is received, and sends this signal to the DC-DC converter 16. The DC-DC converter 16 steps down the voltage on the high-voltage battery 12 side in response to the activation signal from the ECU 18, and outputs the resultant voltage to the low-voltage battery 14 side.

A motor ECU 22 that controls an electric motor 20 that serves as a drive source, and an engine ECU 24 that performs engine control, are connected to the ECU 18. The ECU 18 outputs a command to the motor ECU 22 and the engine ECU 24 such that a required torque that is required for the host vehicle and obtained from an accelerator opening amount and the like is appropriately generated. The motor ECU 22 outputs a command to the electric motor 20 to make the electric motor 20 operate according to the command from the ECU 18. In this case, the electric motor 20 generates rotary torque using the high-voltage battery 12 as the power supply. Also, the engine ECU 24 outputs a command to the engine to make the engine operate according to the command from the ECU 18.

The ECU 18 described above is a low-voltage operating device that operates at a relatively low voltage using the low-voltage battery 14 as the power supply. The ECU 18 is connected to the low-voltage battery 14 via a first power supply line 30. Power from the low-voltage battery 14 is able to flow through this first power supply line 30. The ECU 18 is able to operate with power supplied from the low-voltage battery 14 via the first power supply line 30.

ECUs 32 and 34 that are separate from the ECU 18 are connected, together with the ECU 18, to the first power supply line 30. That is, a plurality (three in FIG. 2) of ECUs 18, 32, and 34 are connected to the low-voltage battery 14 via the first power supply line 30. It is sufficient that at least one ECU other than the ECU 18 is connected to the first power supply line 30, but it is preferable that at least two ECUs other than the ECU 18 be connected to the first power supply line 30. The ECUs 32 and 34 are both low-voltage operating devices that operate at a relatively low voltage using the low-voltage battery 14 as the power supply when the ignition is on, for example. In particular, these ECUs 32 and 34 are, for example, the motor ECU 22 described above that controls the electric motor or the engine ECU 24 described above that performs engine control necessary to, run the vehicle, and a brake ECU that performs brake control. The ECUs 32 and 34 are able to operate with power supplied from the low-voltage battery 14 via the first power supply line 30.

Also, a plurality of ECUs 38 and 40 (two in FIG. 2) are connected to the low-voltage battery 14 via a second power supply line 36. It is sufficient that at least one ECU be connected to the second power supply line 36, but it is preferable that two or more ECUs be connected to the second power supply line 36. Power from the low-voltage battery 14 is able to flow through the second power supply line 36. The ECUs 38 and 40 are both low-voltage operating devices that operate at a relatively low voltage using the low-voltage battery 14 as the power supply when an accessory switch is on or the ignition is on, for example. These ECUs 38 and 40 are a navigation ECU and an air-conditioner ECU for improving convenience to occupants in the vehicle, for example. The ECUs 38 and 40 are able to operate with power supplied from the low-voltage battery 14 via the second power supply line 36.

A fuse 42 is attached midway in the second power supply line 36. The fuse 42 is a safety device that can be attached and removed by a worker or the like, for enabling/interrupting an electrical connection between the low-voltage battery 14 and the ECUs 38 and 40. In particular, the fuse 42 is a transport fuse that is removed from the second power supply line 36 while the vehicle is being transported, which is from the time that the high-voltage battery 12 is charged to a capacity of equal to or greater than a predetermined threshold value that will be described later, such as a fully charged state, and the host vehicle is assembled, until the host vehicle is delivered, and that is attached to the second power supply line 36 at the time of delivery. When the fuse 42 is attached to the second power supply line 36, power from the low-voltage battery 14 is allowed to be supplied to the ECUs 38 and 40. On the other hand, when the fuse 42 is removed from the second power supply line 36, power from the low-voltage battery 14 is prohibited from being supplied to the ECUs 38 and 40.

The ECUs 18, 32, and 34 that are connected to the first power supply line 30, and the ECUs 38 and 40 that are connected to the second power supply line 36 are communicatively connected together via in-vehicle LAN 44. The in-vehicle LAN 44 is a communication line for sending and receiving data between ECUs according to a predetermined communication protocol. This in-vehicle LAN 44 is CAN (Controller Area Network) or the like, for example. The ECUs 18, 32, 34, 38, and 40 send and receive data and messages to and from each other through the in-vehicle LAN 44. Hereinafter, these ECUs 18, 32, 34, 38, and 40 will be referred to as ECU-A, ECU-B, ECU-C, ECU-D, and ECU-E, respectively.

Figure 3:
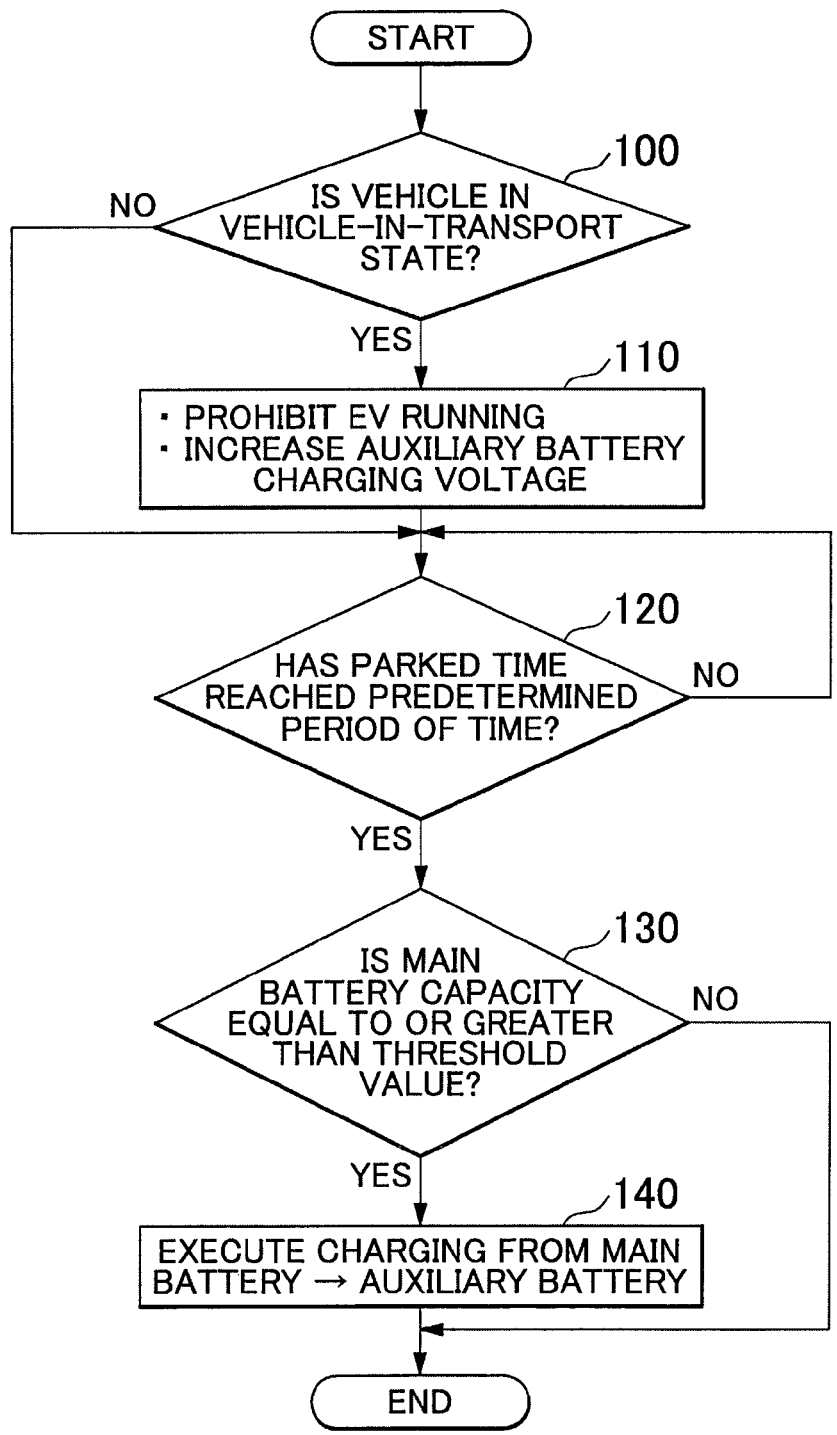
FIG. 3 is a flowchart illustrating an example of a main routine executed in the running control apparatus of the example embodiment.
Figure 4:
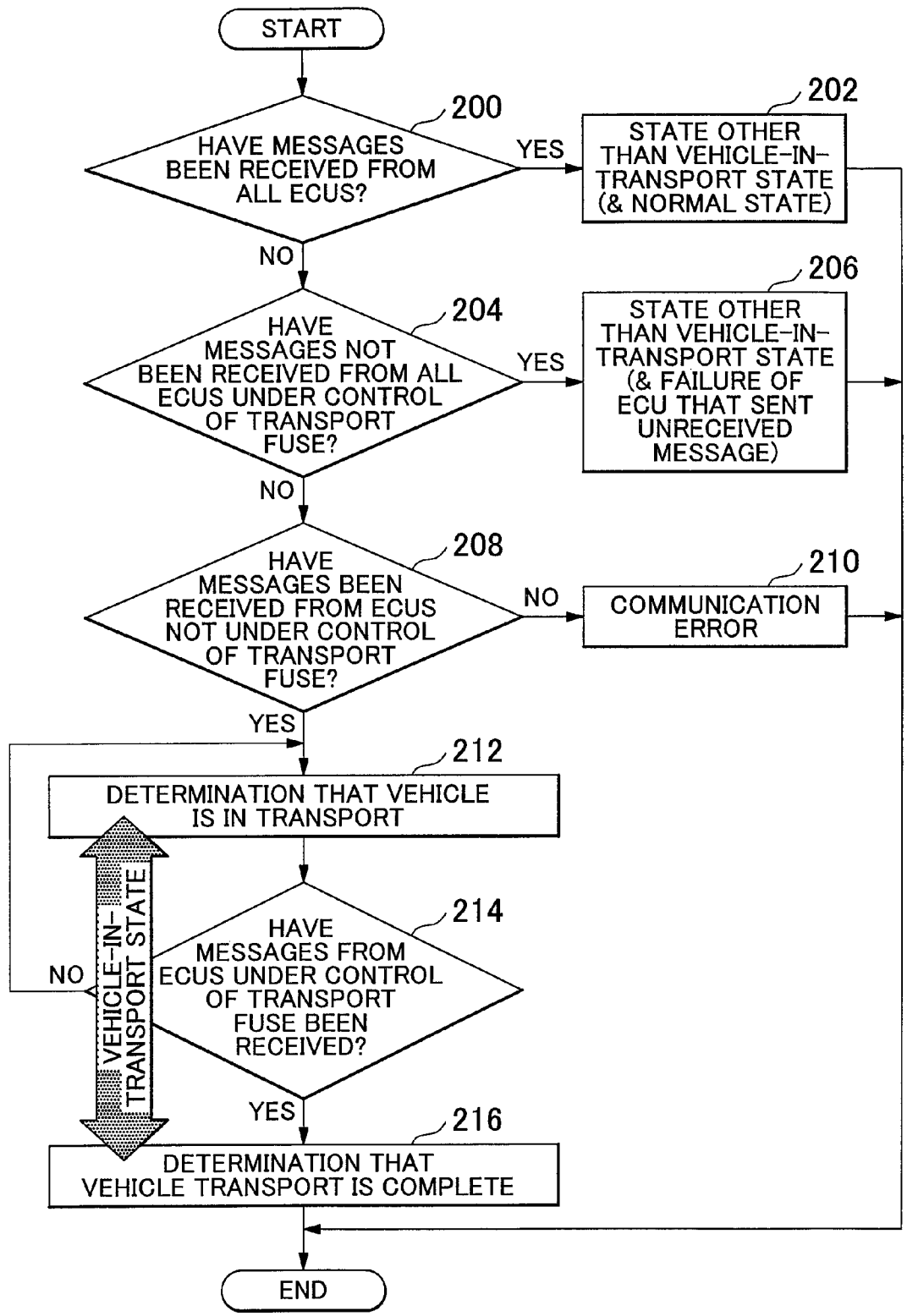
FIG. 4 is a flowchart illustrating an example of a subroutine executed in the running control apparatus of the example embodiment.
Figure 6:
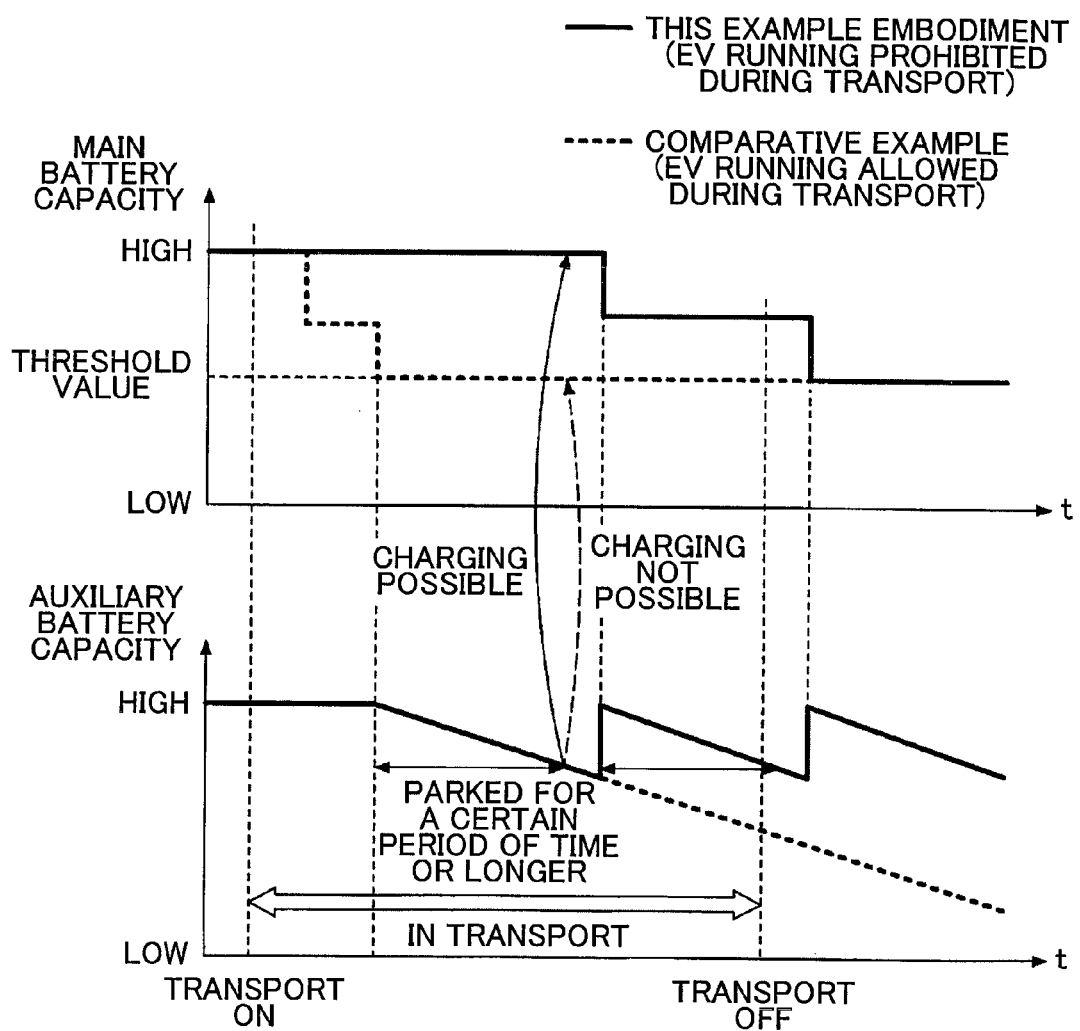
FIG. 6 is a graph illustrating an effect of the running control apparatus of the example embodiment.

Next, the operation of the running control apparatus 10 of this example embodiment will be described with reference to FIGS. 3 to 6. FIG. 3 is a flowchart illustrating an example of a main routine executed by the ECU-A in the running control apparatus 10 of this example embodiment. FIG. 4 is a flowchart illustrating an example of a subroutine executed by the ECU-A in the running control apparatus 10 of this example embodiment. FIG. 5 is a chart showing a matrix for determining the vehicle state according to whether the ECU-A has received messages sent from the other ECUs, i.e., the ECU-B, the ECU-C, the ECU-D, and the ECU-E, in the running control apparatus 10 of the example embodiment. Also, FIG. 6 is a graph illustrating an effect of the running control apparatus 10 of the example embodiment.

In this example embodiment, the hybrid vehicle is selectively controlled to drive in an EV running mode (also referred to as "EV running" in this specification) in which the electric motor is used as the drive source, and an engine running mode (also referred to as "engine running" in this specification) in which the engine is used as the drive source. More specifically, typically EV running is allowed when the SOC of the high-voltage battery 12 is equal to or greater than a predetermined threshold value. Also, in a state in which this EV running is allowed, the host vehicle will not run in the EV running mode when a predetermined condition of the accelerator opening amount or the vehicle speed or the like is not satisfied, but the host vehicle will run in the EV running mode when this predetermined condition is satisfied. On the other hand, when the SOC of the high-voltage battery 12 is equal to or greater than the predetermined threshold value but the predetermined condition is not satisfied, and when the SOC of the high-voltage battery 12 is less than the predetermined threshold value, EV running is prohibited and the host vehicle runs with the engine, i.e., runs in the engine running mode. Also, if the SOC of the high-voltage battery 12 decreases, the host vehicle generates power by running in the engine running mode, and charges the high-voltage battery 12.

Furthermore, the high-voltage battery 12 is assembled to the hybrid vehicle after being charged to a SOC of equal to or greater than the threshold value (preferably to a fully charged state). Also, the fuse 42 that allows/interrupts the flow of power in the second power supply line 36 is removed from this second power supply line 36 by a worker after assembly of the vehicle is complete, and is attached to the second power supply line 36 by a worker at the time of delivery after transport of the vehicle is complete.

In this example embodiment, when the hybrid vehicle is assembled, the ECU-A determines at predetermined intervals of time whether the host hybrid vehicle is in transport (i.e., in a state from after being assembled until being delivered; also referred to as a "vehicle-in-transport state") (step 100). The host hybrid vehicle may be determined to be in transport (i.e., Yes in step 100) during a period from after assembly of the vehicle is complete until the vehicle is delivered, via the route of vehicle assembly plant→domestic yard→ship→overseas yard→dealer, for example, as well as during a period that includes when a worker is moving the vehicle. Also, the host hybrid vehicle may be determined to be in transport (i.e., Yes in step 100) during just part of this period, but it is preferable that the host hybrid vehicle be determined to be in transport (i.e., Yes in step 100) during this entire period, and be determined to not be in transport (i.e., No in step 100) at any time other than during this period.

When determining whether the host hybrid vehicle is in the vehicle-in-transport state in step 100 as described above, the ECU-A executes the routine shown in FIG. 4. More specifically, first the ECU-A determines whether messages b, c, d, and e have been received from all of the other ECUs, i.e., ECU-B, ECU-C, ECU-D, and ECU-E, that are communicatively connected via the in-vehicle LAN 44 (step 200).

These messages b, c, d, and e, need only be sent to the ECU-A from the ECU-B, the ECU-C, the ECU-D, and the ECU-E via the in-vehicle LAN 44, and may be various data and the like to be sent regularly.

As a result, when the ECU-A has determined in step 200 that the messages b, c, d, and e have been received from all of the ECUs, i.e., the ECU-B, the ECU-C, the ECU-D, and the ECU-E, the ECU-A determines that the fuse 42 is attached to the second power supply line 36, and thus determines that the host hybrid vehicle is in a state other than the vehicle-in-transport state (or more specifically, a normal state) (step 202). In this case, the ECU-A determines in step 100 that the host hybrid vehicle is not in the vehicle-in-transport state.

On the other hand, when the ECU-A has determined in step 200 that the message b, c, d, and e from at least one of the ECUs, from among all of the ECUs, i.e., the ECU-B, ECU-C, and ECU-D, and ECU-E, has not been received, the ECU-A executes the next step. In the next step, the ECU-A determines whether the messages d and e from all of the ECUs positioned under the control of the fuse 42 in the second power supply line 36 (more specifically, the ECU-D and the ECU-E that are connected to the second power supply line 36) have not been received (step 204).

As a result, when the ECU-A has determined in step 204 that the message d and e from at least one of the ECUs, from among the ECUs positioned under the control of the fuse 42 in the second power supply line 36, has been received, the ECU-A determines that the fuse 42 is attached to the second power supply line 36, and thus determines that the host hybrid vehicle is in a state other than the vehicle-in-transport state (step 206). The state other than the vehicle-in-transport state is a state in which it is determined that, when the message d is received but the message e is not received, there is a failure or the like in the ECU-E that sent the unreceived message e. In this case, the ECU-A determines in step 100 that the host hybrid vehicle is not in the vehicle-in-transport state.

On the other hand, when the ECU-A determines that the messages d and e from all of the ECUs that are positioned under the control of the fuse 42 in the second power supply line 36 have not been received in step 204, the ECU-A executes the next step. In the next step, the ECU-A determines whether the messages b and c from the ECUs other than the ECUs positioned under the control of the fuse 42 in the second power supply line 36 (more specifically, the ECU-B and the ECU-C positioned in the first power supply line 30, excluding the ECU-A) have been received (step 208).

As a result, if the ECU-A has determined in step 208 that the messages b and c from the ECUs positioned in the first power supply line 30 have not been received, the ECU-A determines that the messages b, c, d, and e from all of the other ECUs, i.e., the ECU-B, the ECU-C, the ECU-D, and the ECU-E, that are communicatively connected via the in-vehicle LAN 44, have not been received, and determines that a communication error has occurred between the ECU-A and the other ECUs (step 210). In this case, the ECU-A determines in step 100 that the host hybrid vehicle is not in the vehicle-in-transport state.

On the other hand, when the ECU-A has determined in step 208 that the messages b and c from the ECUs positioned in the first power supply line 30 have been received, the messages b and c from the ECUs positioned in the first power supply line 30 have been received, but the messages d and e from all of the ECUs positioned in the second power supply line 36 have not been received. As a result, the ECU-A determines that the fuse 42 has been removed from the second power supply line 36, and thus determines that the host hybrid vehicle is in the vehicle-in-transport state (step 212). In this case, the ECU-A determines in step 100 that the host hybrid vehicle is in the vehicle-in-transport state.

If the ECU-A determines in step 212 that the host hybrid vehicle is in the vehicle-in-transport state, the ECU-A then determines whether the messages d and e from the ECUs positioned under the control of the fuse 42 in the second power supply line 36 (more specifically, the ECU-D and the ECU-E that are connected to the second power supply line 36) have been received (step 214).

As a result, if it has been determined that the messages d and e from the ECU-D and the ECU-E have not been received, it is determined that the host hybrid vehicle is in the vehicle-in-transport state at this time in the process as well. On the other hand, if it has been determined that the messages d and e from the ECU-D and the ECU-E have been received, it is determined that the fuse 42 has been attached to the second power supply line 36 between the time of the last process and the time of this process, so it is determined that the host hybrid vehicle is no longer in the vehicle-in-transport state (step 216). In this case, the ECU-A determines in step 100 that the host hybrid vehicle is not in the vehicle-in-transport state.

When the ECU-A has determined in step 100 that the host hybrid vehicle is in the vehicle-in-transport state, the ECU-A then prohibits EV running using the high-voltage battery 12 and makes a charging voltage when charging the low-voltage battery 14 higher than a charging voltage when the host hybrid vehicle is not in the vehicle-in-transport state (i.e., a normal charging voltage), while the vehicle is in transport (step 110). On the other hand, when the ECU-A has determined that the host hybrid vehicle is not in the vehicle-in-transport state, step 100 is skipped and the next step is executed.

When the ECU-A executes the process in step 100 or 110, the ECU-A then determines whether a parked time during which the host hybrid vehicle has continued to be parked has reached a predetermined period of time after charging of the auxiliary low-voltage battery 14 was complete the last time (step 120). This predetermined period of time is the shortest period of time for which it can be determined that battery deterioration due to over-discharge will occur in the low-voltage battery 14 when the vehicle has continued to be parked without the low-voltage battery 14 being charged. For example, this predetermined period of time may be one week, two weeks, or one month or the like. This determination is repeatedly made until the result is yes.

Then, when the ECU-A determines that the parked time of the host hybrid vehicle has reached the predetermined period of time, the ECU-A then determines whether the SOC of the high-voltage battery 12 is equal to or greater than a predetermined threshold value (step 130). This predetermined threshold value may be the same value as the SOC of the high-voltage battery 12 that becomes a boundary value in order to select between EV running and engine running, or it may be a different value.

As a result, when the SOC of the high-voltage battery 12 is equal to or greater than the predetermined threshold value, the ECU-A executes charging of the auxiliary low-voltage battery 14 by supplying power from the main high-voltage battery 12 to the auxiliary low-voltage battery 14 via the DC-DC converter 16 (step 140). On the other hand, when the ECU-A has determined that the SOC of the high-voltage battery 12 is less than the predetermined threshold value, the ECU-A does not supply power from the high-voltage battery 12 to the auxiliary low-voltage battery 14 via the DC-DC converter 16, and thus does not charge the low-voltage battery 14.

In this way, in the running control apparatus 10 of this example embodiment, when the host hybrid vehicle is not in the vehicle-in-transport state, EV running using the electric motor 20 that operates with power supplied from the high-voltage battery 12 is allowed, but when the host hybrid vehicle is in the vehicle-in-transport state, this EV running is prohibited.

When EV running is allowed, power is supplied from the high-voltage battery 12 to the electric motor 20 when EV running is executed, so a large amount of power is drained from the high-voltage battery 12 (see the comparative example indicated by the broken line in FIG. 6). On the other hand, when EV running is prohibited, the supply of power from the high-voltage battery 12 to the electric motor 20 that accompanies the execution of EV running is cancelled, so the power drain from the high-voltage battery 12 is limited (see this example embodiment indicated by the solid line in FIG. 6).

Therefore, according to the running control apparatus 10 of this example embodiment, in contrast to the comparative example, EV running is prohibited when the hybrid vehicle is in transport. Therefore, the SOC of the high-voltage battery 12 is inhibited from easily decreasing during transport, so a decrease in the capacity is able to be inhibited. This makes it possible to keep the SOC of the main high-voltage battery 12 relatively high at times such as when the host hybrid vehicle is delivered to a dealer or delivered to a buyer. As a result, there are more chances to be able to charge the auxiliary low-voltage battery 14 using power supplied from the high-voltage battery 12 while the vehicle is in transport. Hence, it is possible to inhibit the low-voltage battery 14 from going dead, and deteriorating due to over-discharge.

In the running control apparatus 10 of this example embodiment, each time the parked time of the host hybrid vehicle reaches the predetermined period of time, power is supplied from the main high-voltage battery 12 to the auxiliary low-voltage battery 14 via the DC-DC converter 16. As a result, the low-voltage battery 14 is able to be charged. Therefore, according to this example embodiment, even if the host hybrid vehicle is left for an extended period of time, the auxiliary low-voltage battery 14 is able to be inhibited from going dead.

Also, in this example embodiment, the charging voltage (i.e., the output voltage that is output from the DC-DC converter 16) when charging the low-voltage battery 14 is higher when the host hybrid vehicle is in the vehicle-in-transport state than it is when the host hybrid vehicle is not in the vehicle-in-transport state.

Typically, when the vehicle is in transport, often the parked time is relatively long and the vehicle is driven only short distances (short trips). Therefore, the capacity of the low-voltage battery 14 tends to decrease and is not easily recovered. In contrast, when the charging voltage to the low-voltage battery 14 is high, the charging efficiency from the high-voltage battery 12 to the low-voltage battery 14 via the DC-DC converter 16 improves. Therefore, according to the running control apparatus 10 of this example embodiment, when the vehicle is in transport, the charging efficiency from the high-voltage battery 12 to the low-voltage battery 14 via the DC-DC converter 16 is able to be improved compared to when the vehicle is not in transport. In this regard as well, it is possible to inhibit the low-voltage battery 14 from going dead.

Moreover, in the running control apparatus 10 according to this example embodiment, a determination as to whether the host hybrid vehicle is in the vehicle-in-transport state is able to be made based on (1) whether the messages d and e from all of the ECUs positioned under the control of the fuse 42 in the second power supply line 36 (more specifically, the ECU-D and the ECU-E), of the plurality of ECUs that are communicatively connected together via the in-vehicle LAN 44, are unable to be received by the ECU-A, and (2) whether the messages b and c from ECUs other than the ECUs positioned under the control of the fuse 42 in the second power supply line 36 (more specifically, the ECU-B and the ECU-C positioned in the first power supply line 30, excluding the ECU-A), of the plurality of ECUs that are communicatively connected together via the in-vehicle LAN 44, are able to be received by the ECU-A.

If both the condition (1) and the condition (2) above are satisfied, i.e., if neither of the messages d and e from the ECU-D and the ECU-E are able to be received by the ECU-A, and the messages b and c from the ECU-B and the ECU-C are able to be received by the ECU-A, then it is determined that the host hybrid vehicle is in the vehicle-in-transport state. On the other hand, if at least one of the conditions, i.e., one of condition (1) and condition (2) above, is not satisfied, then it can be determined that the host hybrid vehicle is not in the vehicle-in-transport state (for example, it can be determined that the host hybrid vehicle is in the normal state or there is a communication error or the like).

The fuse 42 is a transport fuse that is removed from the second power supply line 36 when the vehicle is in transport, and is attached to the second power supply line 36 any time else (i.e., when the vehicle is not in transport), as described above. Therefore, according to the method described above, it is possible to accurately determine whether the host hybrid vehicle is in the vehicle-in-transport state.

Also, in this example embodiment, in order to determine that the host hybrid vehicle is in the vehicle-in-transport state, it is necessary that none of the messages d and e from the plurality of ECUs, i.e., the ECU-D and the ECU-E, that are positioned under the control of the fuse 42 in the second power supply line 36 be received by the ECU-A, and that the messages b and c from the plurality of ECUs in the first power supply line 30, i.e., the ECU-B and the ECU-C, be received by the ECU-A.

That is, in this example embodiment, the determination as to whether the host hybrid vehicle is in the vehicle-in-transport state is made not based on whether messages from only the ECUs positioned under the control of the fuse 42 in the second power supply line 36 are received, nor is it made based on whether messages from only the ECUs in the first power supply line 30 are received. Therefore, according to this example embodiment, it is possible to improve the accuracy of distinguishing between the host hybrid vehicle being the vehicle-in-transport state, and a communication error due to a failure in the other ECU itself that sent the message to the ECU-A via the in-vehicle LAN 44, so the accuracy with which it is determined that the host hybrid vehicle is in the vehicle-in-transport state is able to be improved.

Furthermore, with a structure in which the determination as to whether the host hybrid vehicle is in the vehicle-in-transport state is made based on whether messages are received among a plurality of ECUs that are communicatively connected together via the in-vehicle LAN 44, as is the case in this example embodiment, this determination is able to be made using an existing structure. As a result, a special hardware structure for making this determination does not need to be added (for example, a power supply monitoring line does not need to be added or the like), so the hardware structure does not need to be modified. Therefore, according to this example embodiment, the determination as to whether the host hybrid vehicle is in the vehicle-in-transport state is able to be easily and accurately made without leading to an increase in cost that would result if the hardware structure were modified.

In the example embodiment described above, the "transport state determining portion" described in the claims is realized by the ECU-A executing the process in step 100 in the routine shown in FIG. 3, and executing the routine shown in FIG. 4. The "battery running inhibiting portion" described in the claims is realized by the ECU-A preventing EV running of the host hybrid vehicle in step 110. The "low-voltage battery charging control portion" described in the claims is realized by the ECU-A executing the processes in steps 120 to 140. The "charging voltage control portion" described in the claims is realized by the ECU-A making the charging voltage when charging the low-voltage battery 14 while the vehicle is in transport higher than the normal charging voltage in step 110. Also, the DC-DC converter 16 corresponds to the "voltage converter" described in the claims.

In the example embodiment described above, it is determined that the host hybrid vehicle is in the vehicle-in-transport state when (1) neither of the messages d and e from the ECU-D and the ECU-E positioned under the control of the fuse 42 in the second power supply line 36 are received by the ECU-A, and (2) the messages b and c from the ECU-B and the ECU-C positioned in the first power supply line 30, excluding the ECU-A, of the ECUs other than ECUs positioned under the control of the fuse 42 in the second power supply line 36, are received by the ECU-A. The invention is not limited to this. That is, the host hybrid vehicle may also be determined to be in the vehicle-in-transport state when at least condition (1) above is satisfied.

Also, in the example embodiment described above, when the host hybrid vehicle is in the vehicle-in-transport state, EV running using the high-voltage battery 12 is prohibited, and the charging voltage when charging the low-voltage battery 14 is made higher than the normal charging voltage. The invention is not limited to this. That is, it is sufficient that at least EV running using the high-voltage battery 12 be prohibited when the host hybrid vehicle is in the vehicle-in-transport state.

Also, in the example embodiment described above, EV running using the high-voltage battery 12 is prohibited when the host hybrid vehicle is in the vehicle-in-transport state. The invention is not limited to this. That is, it is sufficient that EV running be inhibited compared with when the host hybrid vehicle is in the vehicle-in-transport state.

For example, typically EV running is allowed when the SOC of the high-voltage battery 12 is equal to or greater than a predetermined threshold value, but is prohibited when the SOC of the high-voltage battery 12 is less than the predetermined threshold value. The predetermined threshold value used to allow/prohibit EV running may also be changed according to whether the host hybrid vehicle is in the vehicle-in-transport state. That is, this predetermined threshold value may also be changed to the side that makes it more difficult for EV running to be allowed when the host hybrid vehicle is in the vehicle-in-transport state, compared to when the host hybrid vehicle is not in the vehicle-in-transport state.

With the structure of this modified example as well, EV running is inhibited so the power drain from the high-voltage battery 12 is limited, when the host hybrid vehicle is in the vehicle-in-transport state, compared to when the host hybrid vehicle is not in the vehicle-in-transport state. As a result, the SOC of the high-voltage battery 12 is able to be inhibited from easily decreasing while the hybrid vehicle is in transport.

Also, the example embodiment described above is applied to a hybrid vehicle, but the method for determining whether the vehicle is in the vehicle-in-transport state, and making the charging voltage when charging the low-voltage battery 14 higher when the vehicle is in transit than it is any other time (i.e., when the vehicle is not in transit) may also be applied to an engine vehicle or the like other than a hybrid vehicle.

For example, a vehicle transport state determining apparatus provided with i) a fuse that is removed from a power supply line when the vehicle is in transport and is attached to the power supply line after transport is complete, and ii) a transport state determining portion that determines that the vehicle is in transport (i.e., in the vehicle-in-transport state) when a message from each of the electronic control units under the control of the fuse in the power supply line is not received, and a message from an electronic control unit not under the control of the fuse is received, is able to accurately determine whether the vehicle is in the vehicle-in-transport state. With this vehicle transport state determining apparatus, a special hardware structure for determining the vehicle transport state does not need to be added (for example, a power supply monitoring line does not need to be added or the like), so the hardware structure does not need to be modified. Therefore, the determination as to whether the host hybrid vehicle is in the vehicle-in-transport state is able to be easily and accurately made without leading to an increase in cost that would result if the hardware structure were modified.

Also, a vehicle charging control apparatus that is an apparatus that controls the charging of an auxiliary battery onboard a vehicle, and that includes i) a transport state determining portion that determines whether the vehicle is in transport (i.e., in the vehicle-in-transport state), and ii) a charging voltage control portion that makes a charging voltage when charging the auxiliary battery higher when it is determined by the transport state determining portion that the vehicle is in transport (i.e., in the vehicle-in-transport state), than when it is not determined by the transport state determining portion that the vehicle is in transport (i.e., in the vehicle-in-transport state), is able to improve the charging efficiency of the low-voltage battery when the vehicle is in transport compared to when the vehicle is not in transport. According to this vehicle charging control apparatus, it is possible to inhibit the low-voltage battery from going dead while the vehicle is in transport.

The invention claimed is:

1. A hybrid vehicle running control apparatus that is mounted in a hybrid vehicle that has a high-voltage battery and a low-voltage battery, and is selectively controlled to drive in a first running mode in which an electric motor to which power is supplied from the high-voltage battery is used as a drive source, and a second running mode in which an engine is used as the drive source, the hybrid vehicle running control apparatus comprising:
an ECU configured to
determine whether the hybrid vehicle is in transport; and
inhibit the hybrid vehicle from running in the first running mode when the hybrid vehicle is determined to be in transport.

2. The hybrid vehicle running control apparatus according to claim 1, wherein
the ECU is configured to prohibit the hybrid vehicle from running in the first running mode when the hybrid vehicle is determined to be in transport.

3. The hybrid vehicle running control apparatus according to claim 1, wherein
the ECU is configured to shift a threshold used to select / deselect the first running mode to a side on which the first running mode is not as easily selected, when the hybrid vehicle is determined to be in transport, compared to when the hybrid vehicle is determined to be not in transport.

4. The hybrid vehicle running control apparatus according to claim 1, wherein
the ECU is further configured to charge the low-voltage battery by supplying power to the low-voltage battery from the high-voltage battery, each time a parked time of the hybrid vehicle reaches a predetermined period of time.

5. The hybrid vehicle running control apparatus according to claim 4, wherein
the ECU is configured to allow power to be supplied from the high-voltage battery and charge the low-voltage battery when a state-of-charge of the high-voltage battery is equal to or greater than a predetermined value.

6. The hybrid vehicle running control apparatus according to claim 1, wherein
the ECU is further configured to make a charging voltage when charging the low-voltage battery higher when the hybrid vehicle is determined to be in transport, than when the hybrid vehicle is not determined to be in transport.

7. The hybrid vehicle running control apparatus according to claim 6, the hybrid vehicle further comprising:
a voltage converter that performs a voltage conversion between the high-voltage battery and the low-voltage battery,
wherein the ECU is configured to make an output voltage to the low-voltage battery from the voltage converter, as the charging voltage, higher when the hybrid vehicle is determined to be in transport, than when the hybrid vehicle is not determined be in transport.

8. The hybrid vehicle running control apparatus according to claim 1, further comprising:
a fuse configured to be removed from a power supply line upon transport of the hybrid vehicle, and is attached to the power supply line after the transport is complete,
wherein the ECU is configured to determine that the hybrid vehicle is in transport when a message from each electronic control unit under control of the fuse in the power supply line is not received.

9. The hybrid vehicle running control apparatus according to claim 8, wherein
the ECU is configured to determines that the hybrid vehicle is in transport when a message from each of the electronic control units under control of the fuse in the power supply line is not received, and a message from an electronic control unit not under control of the fuse is received.

* * * * *